(12) United States Patent
Edwards

(10) Patent No.: US 10,121,137 B2
(45) Date of Patent: Nov. 6, 2018

(54) METHODS AND APPARATUS FOR SELF-SERVICE CHECKOUT

(75) Inventor: Thomas V Edwards, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 584 days.

(21) Appl. No.: 12/825,467

(22) Filed: Jun. 29, 2010

(65) Prior Publication Data

US 2011/0320296 A1  Dec. 29, 2011

(51) Int. Cl.
  *G06Q 20/20* (2012.01)
  *G06Q 30/06* (2012.01)

(52) U.S. Cl.
  CPC ........... *G06Q 20/208* (2013.01); *G06Q 20/20* (2013.01)

(58) Field of Classification Search
  USPC ....... 235/379; 186/61; 700/231; 705/414, 16
  See application file for complete search history.

(56) References Cited

U.S. PATENT DOCUMENTS

| | | | |
|---|---|---|---|
| 5,952,642 A * | 9/1999 | Lutz | G07G 3/003 235/383 |
| 6,286,758 B1 | 9/2001 | Dejaeger et al. | |
| 7,036,726 B1 | 5/2006 | Edwards | |
| 7,466,231 B1 | 12/2008 | Seevers | |
| 7,533,799 B2 | 5/2009 | Edwards | |
| 7,575,162 B1 | 8/2009 | Malchak et al. | |
| 7,620,568 B1 | 11/2009 | Parker-Malchak | |
| 7,673,796 B2 | 3/2010 | Kobres et al. | |
| 7,673,797 B2 | 3/2010 | Edwards | |
| 7,866,546 B1 * | 1/2011 | Vance | G07G 1/14 235/379 |
| 2002/0170782 A1 * | 11/2002 | Millikan | A47F 9/048 186/61 |
| 2004/0249501 A1 * | 12/2004 | Hand | G07D 7/00 700/231 |
| 2007/0255665 A1 * | 11/2007 | Oosugi | A47F 9/047 705/414 |
| 2008/0027817 A1 * | 1/2008 | Iizaka | G06Q 20/201 705/20 |
| 2011/0231331 A1 * | 9/2011 | Smith | G06Q 30/0281 705/325 |

* cited by examiner

*Primary Examiner* — Scott A Zare
*Assistant Examiner* — Reva R Danzig
(74) *Attorney, Agent, or Firm* — Schwegman, Lundberg & Woessner

(57) ABSTRACT

A context aware process is utilized to speed self-checkout. In one aspect, such a process is utilized to simplify response to a weight mismatch condition where a produce scale weight and a bagging scale weight for an item differs by more than a predetermined amount. Other examples of the application of such a process to other aspects of self-checkout are provided.

12 Claims, 4 Drawing Sheets

METHODS AND APPARATUS FOR SELF-SERVICE CHECKOUT

FIELD OF THE INVENTION

The present invention relates generally to improved methods and apparatus for speeding self-service checkout, and more particularly to advantageous aspects of context sensitive decision making applied to aspects of self-service checkout, such as the workflow issues flowing from a weight measurement error, and the like.

BACKGROUND OF THE INVENTION

Retail items are sold in a variety of different ways. For example, a barcode on an item to be sold is scanned by a barcode scanner and the price is looked up in a price look-up (PLU) table. A point of sale (POS) terminal builds up a list of items and prices as items are scanned and a total price and itemized receipt are generated in a known manner. Other items are sold by weight, quantity, length or the like.

A wide variety of self-checkout apparatus and solutions have been proposed and adopted over the past decade or so. See, for example, U.S. Pat. Nos. 6,286,758; 7,466,231; 7,575,162; 7,533,799; 7,620,568; 7,673,796; and 7,673,797, all of which are assigned to the assignee of the present invention and incorporated by reference herein in their entirety.

Focusing, by way of example, on the sale of items, such as produce, by weight at a self-service checkout terminal, a common workflow is as follows. The item is scanned or selected from a pictorial list of items presented in a visual list. The resulting item code is presented to an embedded POS terminal, either locally or remotely, or alternately to a store controller. The item attributes are returned from the POS or store controller. These attributes indicate that a weight must be provided before sale of the item can be completed.

The customer is directed to place the item on a produce scale where it is weighed. The item weight is read from the produce scale and provided to the POS terminal or the store controller. The item sale is completed by the POS terminal or store controller. The electronic receipt is updated with the time information and pricing. The transaction sub-totals are updated based on the item sale.

Unfortunately, weight measurement errors do occur and sometimes the weight measurement of the item to be purchased is wrong. A first effect of this error is that the weight of the item to be purchased is wrong resulting in a pricing error. A second effect is that the weight of the item measured by the produce scale can be substantially different from the weight later measured from a bagging security scale resulting in the security system monitoring the transaction to conclude that the item bagged is not the same item which was originally weighed on the produce scale, that the amount of the item has changed, or that some other situation has occurred which requires flagging and attendant intervention thereby bringing the self-checkout process to a halt.

When a weight mismatch occurs for a weighed product, the attendant intervenes to review the event and render a decision to ignore the condition by accepting the weight mismatch or to oversee correction of the weighing and pricing of the weight required item.

The typical steps required to correct such a condition are somewhat time consuming. First, the attendant moves to the lane with the issue. Next, the attendant logs into the self-service checkout terminal in a privileged mode often by scanning an operator ID. The attendant removes the weight mismatched item from the bagging area security scale, and then voids the sale of the item at the incorrect weight. The attendant then exits the self-checkout privileged mode, and places the item correctly on the produce scale. The attendant or customer can now reselect the item typically from a visual item list of produce items for sale. The correct weight is measured and the item is correctly sold. The shopper is then free to bag the item. The security system approves the produce scale weight measurement as matching the bagging area scale weight measurement, and the self-checkout continues with subsequent items, if any.

Because resolution of the issue as just described is rather tedious and time consuming, the attendant may choose the fast and easy approach of simply approving the incorrect item weight measurement, thereby resulting in an uncorrected pricing error being part of the transaction. Worse yet, customers experiencing such delay may choose not to use the self-checkout system.

SUMMARY OF THE INVENTION

Among its several aspects, the present invention recognizes by adding context related decision making to the processor controlling the self-checkout apparatus, that problems such as correcting the weight mismatch problems discussed in detail above can be significantly simplified. For example, as discussed in further detail below, the time required for an attendant to correct the condition may be reduced substantially. Such savings can be of great significance to large retail customers for self-service checkout solutions as the number of self-service transactions increases. Additionally, revenue losses will be reduced by reducing the number of times that an attendant under time pressure simply approves the incorrect item weight rather than correcting the problem. It will be recognized that context related decision making can be advantageously applied to other aspects of self-checkout.

According to one aspect of the invention, a context aware process of self-checkout may suitably comprise: detecting a first error condition requiring intervention by a processor controlling a self-checkout terminal; displaying a notification of the first error condition on a display; detecting a response to the first error condition; detecting a second condition linked with the first condition; recognizing a context of a combination of the detection of the first condition and the second condition; and displaying a context aware display to simplify response to recognizing the context.

A more complete understanding of the present invention, as well as further features and advantages of the invention, will be apparent from the following Detailed Description and the accompanying drawings.

DETAILED DESCRIPTION

Figure 1:
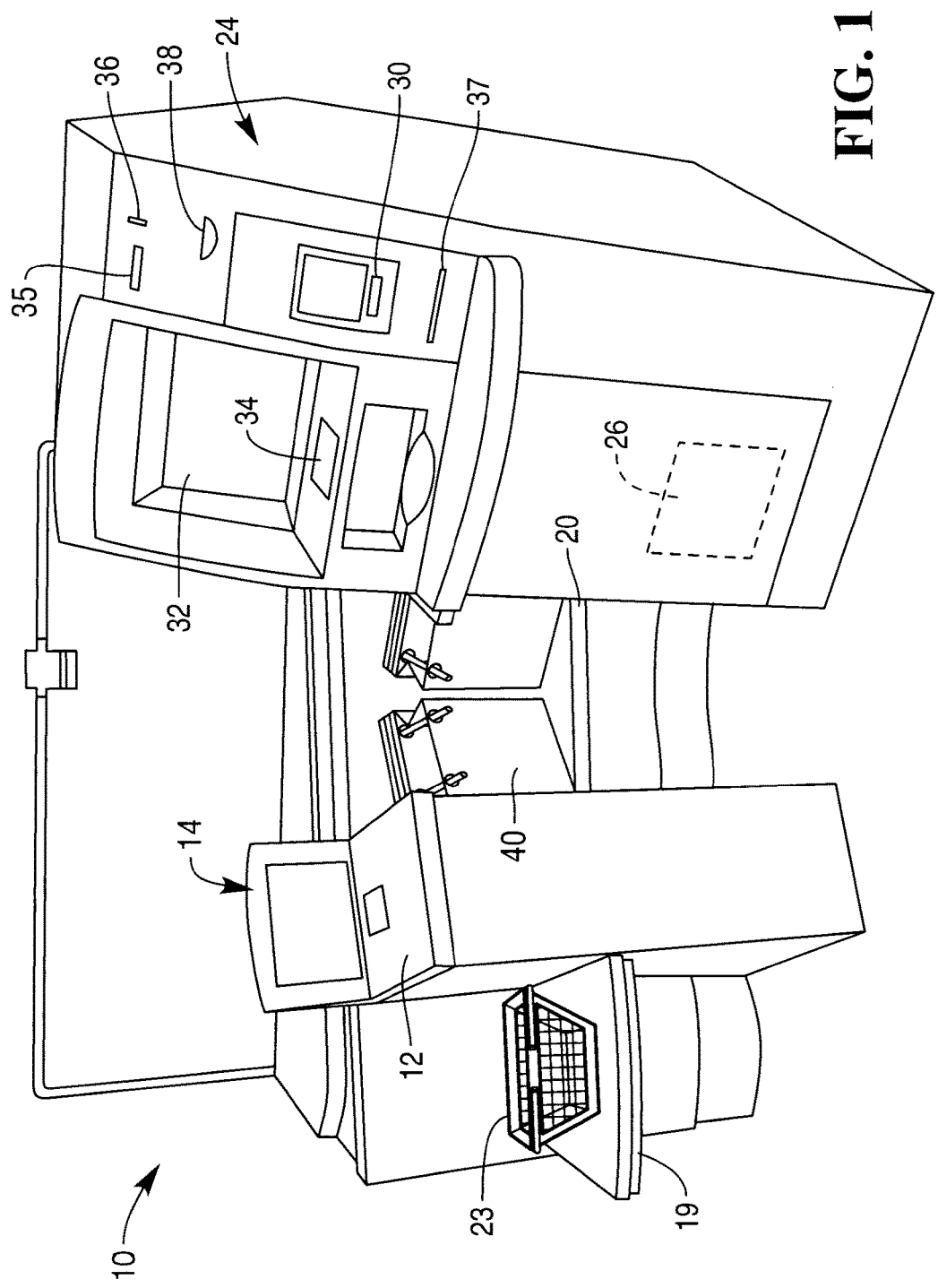
FIG. 1 is a perspective view of a checkout system modified in accordance with the present invention to apply context sensitive decision making.
Figure 2:
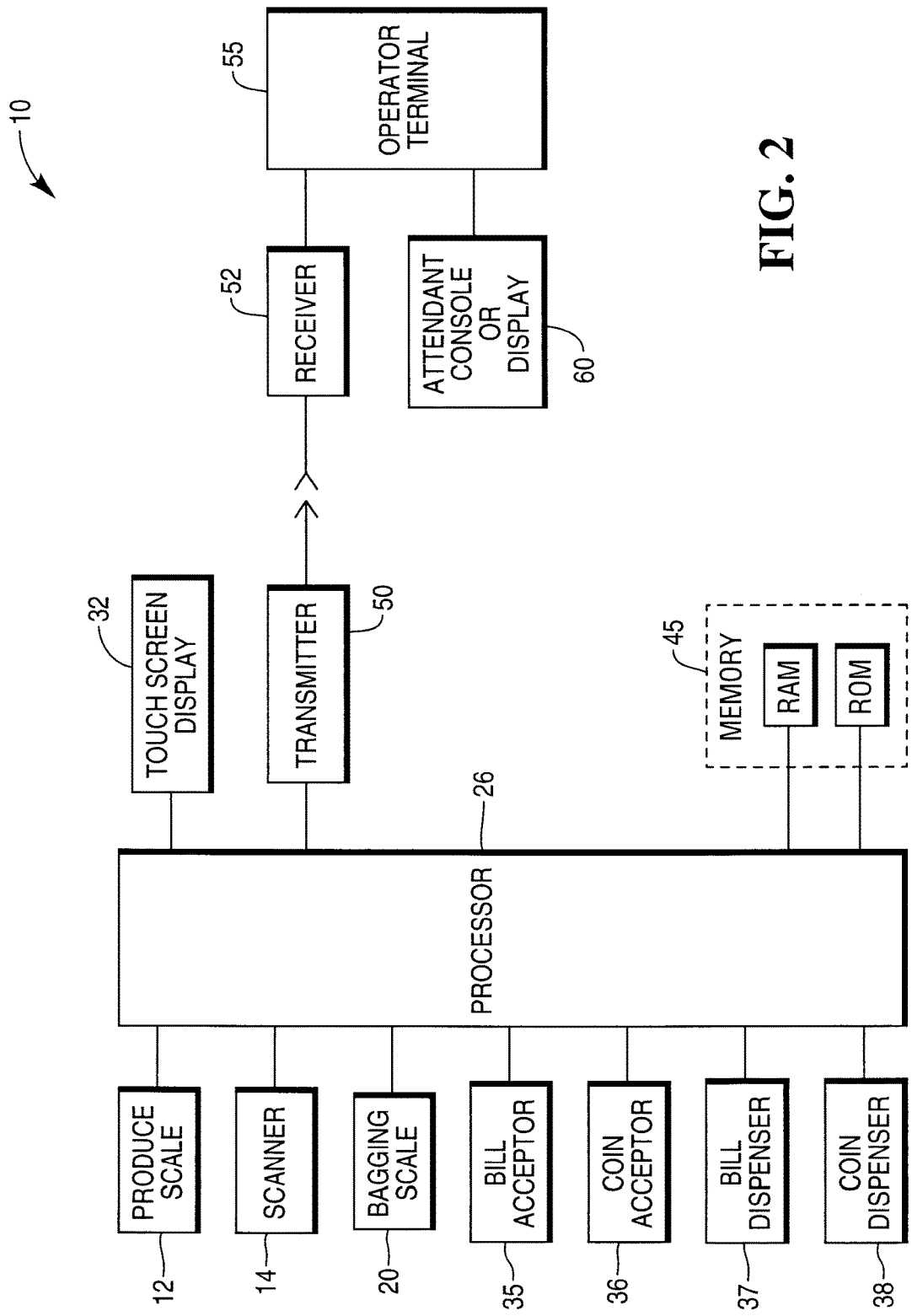
FIG. 2 is a block diagram of part of a control circuit for the checkout system of FIG. 1.

FIG. 1 shows a self-checkout terminal 10 that may be suitably used in a supermarket setting. The terminal 10 includes a product weight scale 12, such as a produce scale, and a scanner 14 associated with the scale. A bagging scale 20 is provided adjacent the scanner to support grocery bags into which the customer places each newly scanned item. The terminal 10 includes a basket scale 19 configured to support a shopping basket 23 full of products. Each of the scales 12, 19 and 20 include at least one weight detector, such as a pressure sensor or a load cell sensor, which is operable to generate a signal in response to the weight of the item placed on the scale. A kiosk 24 includes a display 32, data input device 34 and a payment device 30, as well as, a bill acceptor 35, coin acceptor 36, bill dispenser 37 and coin dispenser 38. A computer or processor 26 is resident within the terminal 10 and executes various software routines associated with the self-checkout process. In particular, processor 26 executes software implementing the processes of FIGS. 3 and 4, for example, as discussed further below in connection with FIG. 2.

The present invention adds new intelligence to the self-checkout application software making it context aware. As seen in the simplified FIG. 2 which shows illustrative components relative to the weight match condition and other exemplary conditions requiring operator input, processor 26 receives inputs from scale 12, scanner 14, bagging scale 20, bill acceptor 35, coin acceptor 36, bill dispenser 37 and coin dispenser 38. It provides outputs to drive touch screen display 32. It has software memory 45 storing software which when executed controls the processor 26 to perform the methods and processes described further herein. It also wirelessly transmits an output to a receiver 52 of an operator terminal 55 which when received by terminal 55 causes that terminal to drive operator console or display 60 to alert an operator to potential problems. It will be recognized that alternatively or additionally an audio notification can be employed and a red or other light can light at self-checkout terminal 10 to further guide the attendant to the problem. Operator terminal 55 and console 60 are remote from the self-checkout terminal 10. In a typical store arrangement, a group of terminals 10 is overseen by a single attendant from an attendant station.

In one example of a weight mismatch condition, a customer places an item of produce, such as a bag of red delicious apples, onto the scale 12 and inputs an identification of the item as red delicious apples, for example, by selecting a picture or representation of the item on touch display 32. Scale 12 produces a weight signal which is output to the processor 26. Display 32 may then prompt the customer to place the item into a bag which sits on the bagging scale 20. Where the apples are the first item, the weight is compared with the weight from scale 12. Where the apples are a subsequent item, the change in weight resulting from bagging the apples is output by the bagging scale 20 or the processor 26 determines the resulting difference. In either case, if the weights from scales 12 and 20 differ by more than a predetermined amount, the processor determines that a weight mismatch has occurred and notifies the attendant to intervene to correct the condition.

In the weight mismatch condition where the attendant is required to intervene to correct the weight mismatch condition, the response utilizing the present invention can be greatly simplified as described below.

The revised response can be simplified as follows. First the attendant moves to the lane with the issue. The attendant retrieves the mismatched item from the bagging area and places it on the scale 12 for reweighing. The attendant logs into the self-service checkout terminal 10 in a privileged mode using a scanner, such as scanner 14 to scan their operator ID. The self-checkout system 10 knows there is a weight mismatch pending on a weight item and senses the presence of an item to be re-weighed now on the scale 12. As a consequence, it presents a special screen on display 32 instead of the typical, normal attendant options screen. This new screen asks "Should the previous weight mismatched item be voided and resold with the weight currently on the produce scale?" An affirmative response button is displayed on the touch screen display 32. Pressing the button causes the previously sold mismatched weight item to be automatically voided by processor 26, then that same item identification information is used to resell the item using the weight now on the scale 12. After the item sale, the attendant is automatically logged out by processor 26, and control of the transaction is returned to the customer who can then bag the item and proceed with the transaction. The security system of processor 26 approves the weight measurement from scale 12 as matching the weight measurement from the bagging scale 20.

Such a revised workflow dramatically reduces the attendant time to resolve the condition, produces correct weight based pricing, and requires only one button press to accept the system recommendation.

In the event that the attendant fails to place the item on the produce scale 12 before logging into the system 10, the system should still recognize the pending weight mismatch condition for a weight required item and prompt the attendant to place the mismatched item on the produce scale 10 or to select cancel to resume normal operator screens.

It is estimated that the time required to correct the condition is reduced from 5-10 seconds for the attendant to log in by scanning an operator ID, clear the weight mismatch, navigate to the void item option, execute the void option, exit the operator mode, place the item on the produce scale, locate the item for sale using item code or selection from visual list of pictures, then bagging the item after the item sale completes down to 1-2 seconds to place the item on the produce scale, scan the operator ID to log in and lastly confirm the auto-void and resell by weight option with the single button press. The attendant is free to leave the lane knowing that the logout is automatic and the shopper can bag the produce item at any time.

Such a time reduction is highly advantageous to the store because the process to correct a weight mismatched weighed item sale can now be more efficiently and effectively corrected by the attendant resulting in accurate and complete pricing for these items, potentially adding to the revenues currently missed by the retailer. Of course, customers like their checkout times to be shorter as well.

Figure 3:
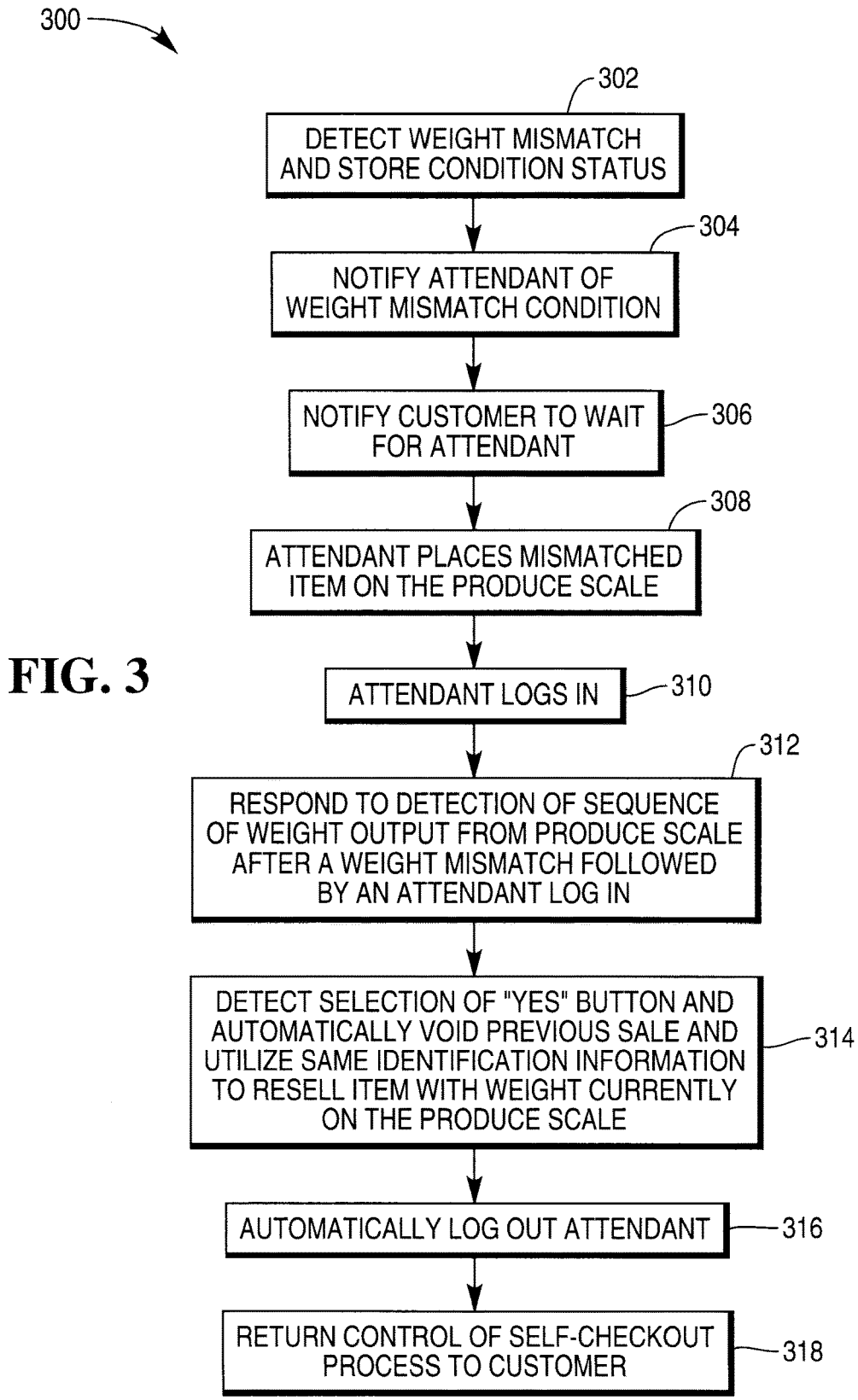
FIG. 3 is a flowchart of a context sensitive decision making process in accordance with the present invention suitable for use in addressing a self-checkout weight mismatch.

FIG. 3 illustrates a context aware process 300 in accordance with the present invention for simplifying the weight mismatch response. In step 302, a weight mismatch is detected by processor 26 and the detected condition status is stored. In step 304, processor 26 causes transmitter 50 to notify the attendant by transmitting a weight mismatch signal to receiver 52 and operator terminal 55. Operator terminal 55 causes operator console 60 to display which self-checkout system 10 has a condition requiring intervention, and in this case that the condition is a weight mismatch condition.

In step 306, the self-checkout system notifies the customer to wait for the attendant. In step 308, the attendant places the mismatched item on the produce scale 12. In step 308, the attendant logs in by scanning an operator ID with scanner 14. While the scanning approach to attendant log in is presently preferred, it will be recognized that other log in approaches may be suitably employed. For example, an operator ID may include an RFID tag which is sensed automatically by an RFID reader of the self-checkout system 10 when the attendant's operator ID is within a predetermined distance of the RFID reader.

In step 312, in response to the processor 26 detecting the combination of the detected sequence of a weight output from produce scale 12 after a weight mismatch followed by an attendant log in, the touch display 32 is driven by processor 26 to present the special screen which asks "Should the previous weight mismatched item be voided and resold with the weight currently on the produce scale? Also, an affirmative response of "YES" button is displayed. It will be recognized that while a presently preferred sequence of steps is described that other sequences may be employed. For example, where the attendant log-in is automated as described above, the combination of an attendant log-in and detection of a weight output might be the desired sequence.

In step 314, if the YES button is touched, the previously sold mismatched weight item is automatically voided and the same identification information is used to resell the item using the weight now on the produce scale 12. In step 316, the attendant is automatically logged out. In step 318, control of the self-checkout process is returned to the customer who can now bag the item and continue to checkout.

While a specific process of addressing a weight mismatch condition is described above in detail, it will be recognized that the context driven approach of the present invention is more generally applicable. Several examples follow below. As illustrated in FIG. 1, the self-checkout terminal 10 includes a basket scale 19. If the customer uses a basket 23, upon removing produce such as a bag of red delicious apples, the basket scale 19 can detect a change in weight equal to the weight of the bag of apples upon their removal. If that bag is then misweighed as a result of being improperly placed on produce scale 12, the context driven approach can be employed to allow the attendant to accept the weight from the bagging and basket scales either from the operator terminal 55 or by pressing a single button at the self-checkout terminal 10.

As another example, it has been recognized that security conditions may advantageously be personalized in a self-checkout setting to take into account a function of a customer's trust level. See, for example, U.S. Pat. No. 7,673,797 assigned to the assignee of the present application and incorporated by reference herein in its entirety. Utilizing the approaches of that patent in conjunction with the present invention, it may be acceptable to a store owner to allow a trusted customer to clear the mismatch condition without involving the attendant. In this situation, a customer having a sufficiently higher level of trust may be recognized by scanning a customer loyalty card. The combination of recognition of such a customer and detection of a weight mismatch condition might be followed by a context responsive screen asking the customer to reweigh the last item.

Another customer having a lower level of trust might be allowed to clear the mismatch only for items identified as having a cost per unit weight of less than a predetermined cost.

A further example is that when the store is particularly busy as sensed by the rate of checkouts using the terminal 10, all customers might be given the chance to clear the mismatch but a camera would then record their efforts and the recording would be flagged for subsequent spot review.

When the bill dispenser 37 or coin dispenser 38 needs replenishment, that condition is recognized by processor 26 which causes transmitter 50 to notify the attendant as discussed above. In such an event, detection of the attendant logging in can be matched with the likelihood that the attendant is there to replenish the coins or denominations needed and that process can be streamlined. Similarly, when bill acceptor 35 and coin acceptor 36 are full or within a predetermined range of full, the cash pickup process can be streamlined by linking a detection of the condition, notification thereof and a subsequent log in response within a predetermined time of such notification.

As another example, more and more shoppers are bringing their own reusable bags to transport their items home. A typical cloth bag is heavier than a typical lightweight plastic or the typical paper bag. The use of the heavier bags can disrupt the typical self-checkout process. A context aware agent according to the present invention can be employed to monitor low-level baggage scale activity for patterns consistent with placing one or more reusable bags on the baggage scale and then offer an automatic correction at attendant log in when an "own bag" condition was detected as likely.

Figure 4:
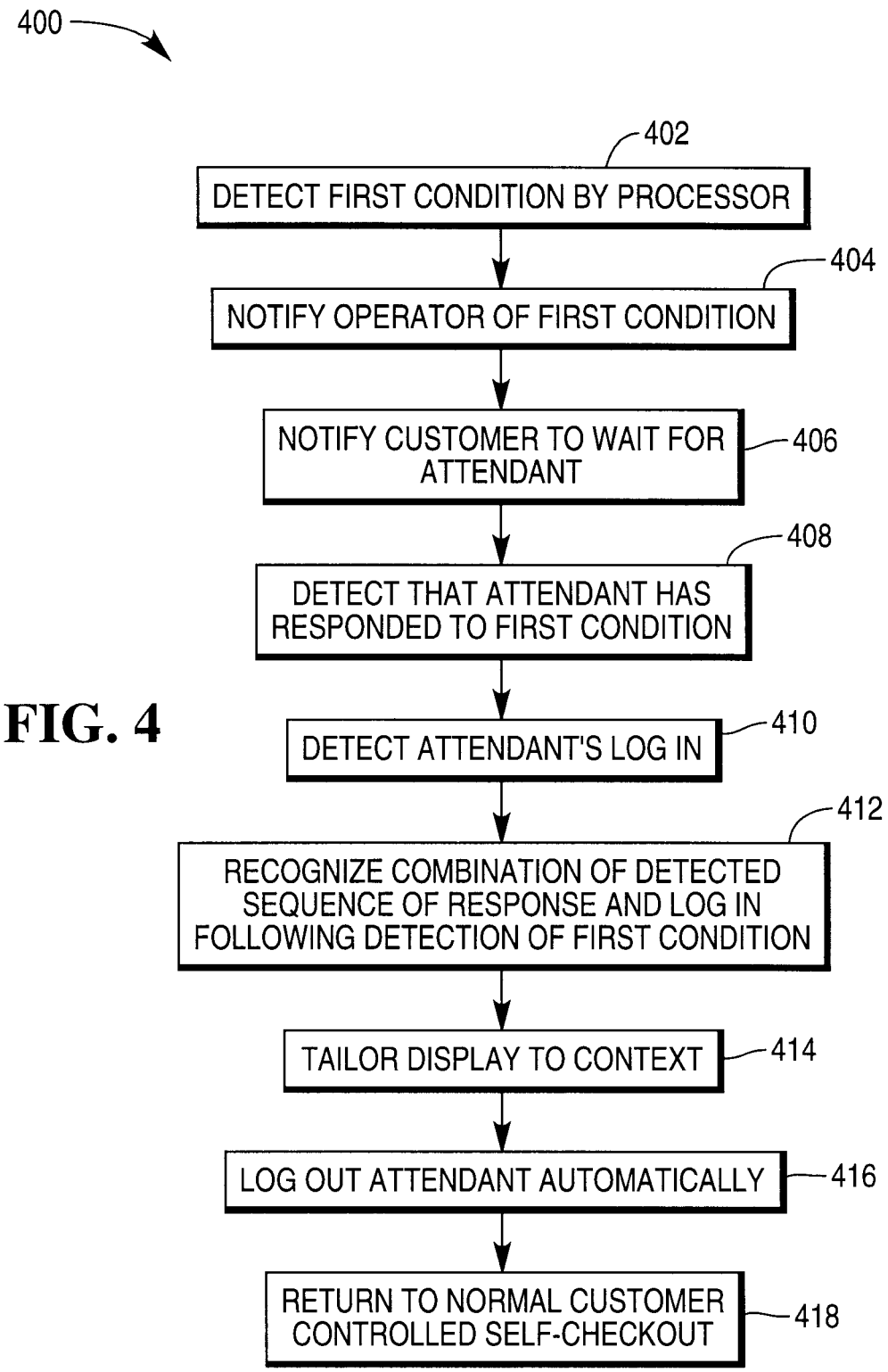
FIG. 4 is a more general flowchart of a context sensitive decision making process in accordance with the present invention for addressing self-checkout transaction problems more generally.

FIG. 4 illustrates a context aware process 400 in accordance with the present invention utilized for simplifying the self-checkout process. In step 402, a first error condition is detected by processor 26 and the detected first error condition is stored. In step 404, processor 26 causes transmitter 50 to notify an operator, such as the customer or the attendant by transmitting a first condition detected signal to receiver 52 and operator terminal 55. Operator terminal 55 causes operator console 60 to display which self-checkout system 10 has the first error condition requiring intervention, and the nature of the condition.

Where the attendant is involved, in step 406, the self-checkout system notifies the customer to wait for the attendant. In step 408, the attendant responds to the first condition. In step 410, the attendant logs in by scanning an operator ID with scanner 14. In step 412, in response to the processor 26 detecting the combination of the detected sequence of detection of a response to the first condition in combination with detection of a linked second condition by output of the terminal 10, such as the produce scale or the touch screen display 32, such as being followed by an attendant log in or preceded by recognition of a trusted customer or the like, the touch display 32 is driven by processor 26 to present a special context screen which prompts the user, as well as display of an affirmative response of "YES" button. It will be recognized as discussed above that some conditions may be addressed without attendant intervention and the steps will be modified accordingly.

In step 414, if the YES button is touched, the first condition is automatically addressed. In step 416, the attendant is automatically logged out if an attendant is involved. In step 418, control of the self-checkout process is returned to the customer who can now continue to checkout.

While the present invention has been disclosed in the context of various aspects of presently preferred embodiments, it will be recognized that the invention may be suitably applied to other environments consistent with the claims which follow.

I claim:

1. A context aware process of self-checkout comprising:
   detecting a first error condition requiring intervention by a processor controlling a self-checkout terminal while a customer is operating the self-checkout terminal for a transaction, and detecting the first error condition from a context agent of the self-checkout terminal that monitors a baggage scale of the self-checkout terminal and providing context for the baggage scale relevant to first error condition;
   displaying, by the processor, a notification of the first error condition on a display where the display is not attached to the self-checkout terminal, wherein the notification is wirelessly sent to the display of an operator terminal, wherein the operator terminal is remote from the self-checkout terminal and, wherein displaying further includes producing an audio notification at the self-checkout terminal for guiding an operator of the operator terminal to the self-checkout terminal and lighting at the self-checkout terminal a light to further guide the operator to the self-checkout terminal;
   detecting, by the processor, a first response of the operator to the first error condition;
   detecting, by the processor, a second condition linked with the first condition, the second condition occurring during resolution of the first error condition by the operator, wherein detecting further includes identifying the second condition by detecting a Radio Frequency (RF) Identifier (ID) sensed by an RFID reader when the operator is within a predetermined distance of the RFID reader;
   recognizing, by the processor, a context of a combination of the detection of the first condition and the second condition;
   displaying, by the processor, a context aware screen associated with the context which simplifies a second response of the operator to recognize the context by displaying a recommendation that can actively resolve the first condition, wherein displaying further includes presenting during the transaction, when the first condition is a weight mismatch, the context aware screen for requesting whether a previous weight mismatched item for a particular item should be voided and resold at a weight determined from a produce scale at the self-checkout terminal; and
   automatically processing, by the processor, a resolution step in response to a single button press to accept the recommendation as the second response and continuing with the transaction.

2. The context aware process of claim 1 wherein the first error condition is a weight mismatch between an output from a produce scale and a bagging area scale for an item.

3. The context aware process of claim 2 wherein the response comprises detecting a weight for an item that has been placed on the produce scale subsequent to detecting the first error condition.

4. The context aware process of claim 1 wherein the operator is an attendant and the notification comprises a message displayed on an attendant monitored operator console to inform the attendant of the first error condition and identifying the self-checkout terminal at which the first error condition has occurred.

5. The context aware process of claim 1 wherein the context of a combination further comprises the response of detecting the weight for the item that has been placed on the produce scale.

6. The context aware process of claim 5 wherein the context aware screen comprises an attendant query and a one touch display button utilized to respond affirmatively.

7. The context aware process of claim 6 where upon selecting the one touch display button, the first error condition is addressed by clearing the weight mismatch, reselling the item utilizing the weight from the produce scale, and automatically logging out the attendant.

8. The context aware process of claim 7 further comprising:
   returning control of the self-checkout process to a customer.

9. The context aware process of claim 1 wherein the first error condition comprises detecting a bill dispenser or coin dispenser requiring replenishment.

10. The context aware process of claim 1 wherein the first error condition comprises detecting a bill acceptor or coin acceptor requiring a cash pickup.

11. The context aware process of claim 1 wherein the first error condition comprises detecting an own bag condition.

12. The context aware process of claim 1 wherein the steps of detecting a first error condition, displaying a notification, and detecting a response are sensed as occurring in sequence and within a predetermined time period.

* * * * *